United States Patent

Ogata et al.

[11] Patent Number: 6,002,654
[45] Date of Patent: Dec. 14, 1999

[54] METHOD AND APPARATUS FOR DISK REPRODUCTION, DISK AND CARDS USED FOR DISK REPRODUCTION APPARATUS

[75] Inventors: Hitoshi Ogata, Sakai; Masanao Yoshida, Osaka; Tokuo Yokota, Kobe, all of Japan

[73] Assignee: Sanyo Electric Co., Ltd., Moriguchi, Japan

[21] Appl. No.: 08/877,725

[22] Filed: Jun. 18, 1997

Related U.S. Application Data

[62] Division of application No. 08/566,908, Dec. 4, 1995, Pat. No. 5,781,515.

[30] Foreign Application Priority Data

Dec. 20, 1994 [JP] Japan .................................. 6-317009
Dec. 28, 1994 [JP] Japan .................................. 6-329021

[51] Int. Cl.$^6$ ........................................... G11B 17/22
[52] U.S. Cl. .................................. 369/32; 369/48
[58] Field of Search .............................. 369/32, 48–49, 369/59, 58, 64–65, 33, 36–39, 52; 360/48

[56] References Cited

U.S. PATENT DOCUMENTS

| | | | |
|---|---|---|---|
| 4,899,326 | 2/1990 | Takeya et al. | 369/36 |
| 5,285,437 | 2/1994 | Yokota et al. | 369/64 |
| 5,781,515 | 7/1998 | Ogata et al. | 369/32 |

FOREIGN PATENT DOCUMENTS

| | | |
|---|---|---|
| 58-139313 | 8/1983 | Japan . |
| 59-56205 | 3/1984 | Japan . |
| 59-177085 | 11/1984 | Japan . |
| 63-190438 | 8/1988 | Japan . |
| 1-140615 | 9/1989 | Japan . |
| 3-46474 | 2/1991 | Japan . |
| 4-44666 | 2/1992 | Japan . |
| 4-111258 | 4/1992 | Japan . |
| 4-85396 | 7/1992 | Japan . |
| 5-120850 | 5/1993 | Japan . |

Primary Examiner—Ali Neyzari
Attorney, Agent, or Firm—Armstrong, Westerman, Hattori, McLeland, & Naughton

[57] ABSTRACT

A method and an apparatus for disk reproduction, in which information associated with an audio band signal for controlling the reproduction operation of the disk reproduction apparatus is read from a disk storing the information associated with the audio band signal independent of acoustic information, and the reproduction of the acoustic information and the information associated with the audio band signal is controlled on the basis of the information associated with the audio band signal thus read out. A predetermined track number and a predetermined index number are specified independently of each other using a card, and a command is outputted for accessing the area of the track number and the index number thus specified.

4 Claims, 13 Drawing Sheets

TRACK No.  02
INDEX No.  06  07  08  09

Lch  "…QUESTION…" "1st MESSAGE" "2nd MESSAGE"
Rch  #43DC  ✻A

FIG. 7

| TRACK No. | 02 | | | | |
|---|---|---|---|---|---|
| INDEX No. | 06 | 07 | 08 | 09 | 10 |

Lch: "QUESTION 1" "QUESTION 2" "QUESTION 2" "QUESTION 3" "QUESTION 3"

Rch: #01CD #0202090210 #0202110212 #0302130214 #0302140215

| TRACK No. | 02 | | | | |
|---|---|---|---|---|---|
| INDEX No. | 11 | 12 | 13 | 14 | 15 | 16 |

Lch: "QUESTION 3" "QUESTION 3" "THREE CORRECT ANSWERS" "TWO CORRECT ANSWERS" "ONE CORRECT ANSWER" "NO CORRECT ANSWER"

Rch: #0302140215 #0302150216 ✻0217 ✻0217 ✻0217 ✻D

FIG. 8

| | |
|---|---|
| TRACK No. | 02 |
| INDEX No. | 06　　　07 |

| | |
|---|---|
| Lch | "1st MESSAGE" "2nd MESSAGE" |
| Rch | *00C |

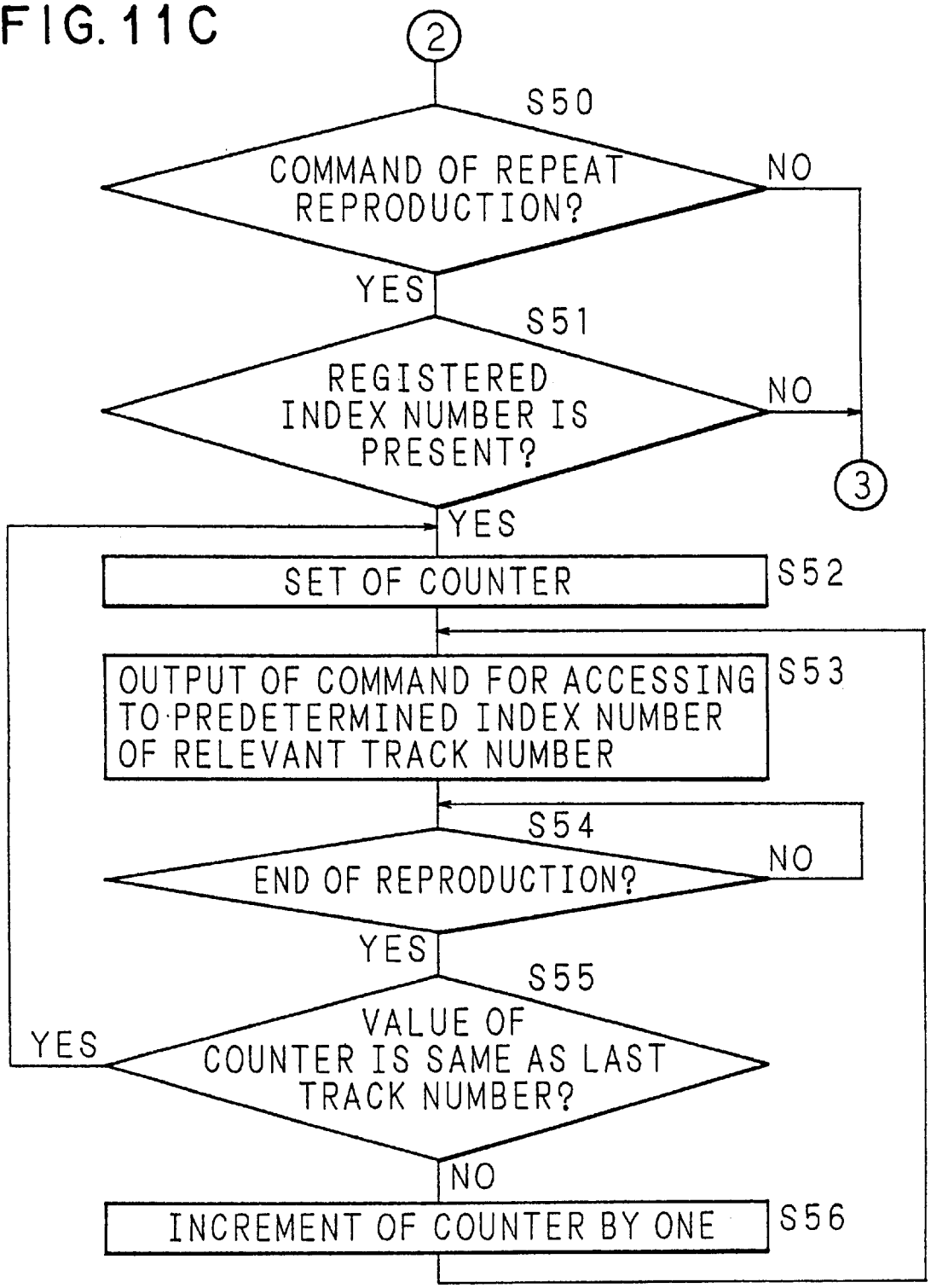

METHOD AND APPARATUS FOR DISK REPRODUCTION, DISK AND CARDS USED FOR DISK REPRODUCTION APPARATUS

This is a divisional of application Ser. No. 08/566,908 filed Dec. 4. 1995 now U.S. Pat. No. 5,781,515.

BACKGROUND OF THE INVENTION

1. Field of the invention

The present invention relates to a method and an apparatus for reproducing acoustic information from a disk such as a CD (Compact Disk) recording acoustic information, the disk and cards used for the disk reproduction apparatus.

2. Description of Related Art

A disk reproduction apparatus has a CD mounted thereon and recording acoustic information as a digital signal, which digital signal is read out by a pickup while rotating the CD and an analog signal obtained by digital-to-analog conversion is amplified and outputted from the speaker. The CD has tracks recording acoustic information spirally formed on one of the surfaces thereof. There are 99 or less tracks, each of which is assigned a track number according to a predetermined standard. Each track is divided into 100 or less portions, each of which is assigned an index number also according to a predetermined standard. The index number, combined with the track number, constitutes an address. Each track is allotted with a read-in area recording TOC (Table Of Contents) information representing the address structure of the next program area or the like, a program area recording acoustic information and a read-out area recording ending information of all the programs sequentially from the leading portion of the track.

When the CD is mounted on and the reproduction start is commanded to the disk reproduction apparatus, the disk reproduction apparatus reads the TOC information from the CD and displays the information on the display for a predetermined length of time, after which the acoustic information recorded in the program area of the CD is reproduced sequentially from the leading portion. Upon application of the address mentioned above thereto, on the other hand, the disk reproduction apparatus reproduces the acoustic information recorded in the relevant address. Further, when a repeat command is given, the disk reproduction apparatus repeatedly reproduces the acoustic information or the designated address or a plurality of acoustic information between designated addresses.

In the conventional disk reproduction apparatus, when used for education, for example, the voice information recorded in the CD is reproduced and outputted so that a user can hear and learn the information. In this unidirectional type of operation, however, applications are limited only to narrow fields including the language education.

Also, there is a disk reproduction apparatus in which a CD recording a plurality of pieces of music is mounted, the digital signal read from the CD by a pickup arranged in opposed relation to the CD is converted into an analog signal and music is outputted from the speaker. In this type of apparatus, a desired piece of music is selected for reproduction from the CD by operating a music selection button on the body or ten-keys on a remote controller.

With the above-mentioned disk reproduction apparatus, it is difficult for infants to perform the music selection operation. U.S. Pat. No. 5,285,437 proposes the following disk reproduction apparatus. A card formed with a plurality of holes associated with the track numbers recording music is fitted in a card insertion slot of the body, and a plurality of optical sensors arranged in the card insertion slot detect the presence or absence and the position of a hole formed in the card, whereby the track number designated by the-relevant card is determined, the track number is accessed and the desired music is reproduced. In this disk reproduction apparatus, a picture and words of a song associated with the music designated by a card are printed on that card, so that infants can replace the card in the body and reproduce the desired music on the basis of the picture and the words printed on the card.

The conventional disk reproduction apparatus described above, when applied to the language education or the like, however, poses the following problem. Each area assigned a track number of the CD used for the language education is divided into a plurality of portions each assigned an index number. An address is constructed of a track number and an index number. The track number and the index number can use 0 to 99 according to a standard. As a result, a CD can have a maximum of $1\times10^4$ addresses. Therefore, an index number can be assigned to each sentence, for example, recorded in a track, and only the sentence of a desired index number can be repeated and learned. In order to meet this requirement, however, a multiplicity of cards formed with holes for identifying addresses are required, which is not practical.

With CDs recording words, by contrast, they are classified into the beginners', middle and advanced courses, and the CD is appropriately replaced in accordance with the progress of the learning. Nevertheless, it is difficult for infants to replace the CD. Further, the CD is required for each of the beginners', middle and advanced courses, thereby leading to a high cost.

SUMMARY OF THE INVENTION

An object of the invention is to provide a method for disk reproduction, an apparatus and a disk that can be widely used for executing the method, in which, on the basis of information associated with a predetermined audio band signal read from the disk, the reproduction of acoustic information and the information associated with the audio band signal recorded in the disk is controlled.

Another object of the invention is to provide a disk reproduction apparatus in which even infants can easily designate an address by identifying a track number and an index number independently of each other through a card.

Still another object of the invention is to provide a disk reproduction apparatus in which the portion determined by the index number registered and the track number identified is accessed, whereby a disk recording contents of different levels can be used, thereby reducing the cost.

A disk reproduction apparatus according to the invention includes a decoder for decoding information associated with an audio band signal for controlling the reproduction operation read from a disk recording such information independently of the acoustic information and outputting a command signal, and a control section for accepting the command signal from the decoder and controlling the reproduction of the acoustic information and the information associated with the audio band signal in accordance with the command signal.

In addition to the acoustic information such as voice and music, the disk records the information to be reproduced into an audio band signal for controlling the reproduction operation including the movement of a pickup and the setting of an output level of a disk reproduction apparatus, which audio band signal is a DTMF (Dual Tone Multifrequency) signal, for example. The upper and lower limits of the frequency of this audio band signal are the same as the upper and lower limits respectively of the frequency permitted for reproduction of the acoustic information. The information associated with the audio band signal read from the disk is decoded into, for example, a command signal for jumping to a predetermined index unconditionally, a command signal for jumping to a different index on the basis of set conditions, or other command signal determined in accordance with an audio band signal in advance, and then the reproduction of the acoustic information and the information associated with the audio band signal is controlled in accordance with the command signal.

Assume, for example, that a disk is used which records information associated with an audio band signal to be decoded into a command signal with an answer to a question set as a condition in accordance with a voice signal of the question, together with a message to be outputted in accordance with the situation meeting or not meeting the particular condition. After outputting the voice of a question, an appropriate message is outputted in accordance with the input from the user.

This disk reproduction apparatus has means for deciding whether a particular disk records information associated with an audio band signal on the basis of a construction information associated with the construction of the information recorded in the disk and the audio band signal associated with the audio band signal recorded in and read from the disk recording such information, and means for reducing the output level for the same information when the decision means decides that the information associated with the audio band signal is recorded.

The construction information associated with the construction of the information recorded in the disk, such as TOC information, is recorded in the disk, and it is decided whether the disk records information associated with an audio band signal according to the construction information or the information associated with the audio band signal. In the case where the decision is that the information associated with the audio band signal is recorded, the output level of the reproduced information associated with the audio band signal is reduced. In the case where the decision is otherwise, on the other hand, the output level is not reduced. As a result, the sound with respect to the information associated with the audio band signal is reduced only for the disk recording the particular information, while the acoustic information recorded in the disk not recording the information associated with the audio band signal is reproduced and outputted as in normal case.

The disk reproduction apparatus further includes means for performing a predetermined output operation in the case where it is decided that information associated with an audio band signal is recorded in the disk reproduction apparatus. In the case where it is decided that the disk records an audio band signal, a predetermined character, pattern or the like is displayed or a voice is outputted. As a result, the type of the disk mounted on the disk reproduction apparatus is displayed for a moment.

A disk according to the invention is mounted on a disk reproduction apparatus for reproducing the acoustic information recorded in the disk. In addition to the acoustic information, information associated with an audio band signal for controlling the reproduction operation of the disk reproduction apparatus is also recorded in the disk.

Another disk reproduction apparatus according to the invention has means for deciding whether or not the identification mark of a card having an identification mark commanding access to a designated track number or an identification mark commanding access to a designated index number designates an index number, means for identifying an index number in the case where the decision means decides that the index number is designated, means for registering the index number, means for being registered the index number, means for deciding whether there is any index number registered, means for updating and registering an identified index number in the case where there is a registered index number, means for deciding whether the identification mark of the card designates a track number, means for identifying a designated track number in the case where the decision is that the track number is designated, and means for outputting a command for accessing the area of an identified track number and a registered index number.

Each of a plurality of areas assigned a track number has a plurality of portions assigned an index number. A disk recording information in each portion is mounted, and it is decided whether the identification mark of a card having an identification mark commanding access to a designated track number or an identification mark commanding access to a designated index number designates an index number. In the case where the decision is that an index number is designated, the index number designated by the identification mark is identified. It is decided whether there is an index number already registered, and in the absence of a registered index number, an identified index number is recorded in a predetermined area of a memory section, for example, and in the case where a registered index number exists in that predetermined area, the index number is updated to the identified particular index number for registration. Also, in the case where the decision as to whether the identification mark of a card designates a track number is that a track number is designated, the designated track number is identified. And a command is outputted for accessing the portion of the identified track number and the registered index number.

Upon registration of an index number, therefore, an area of the same index number is reproduced for a different track number. Also, in the case where only an index number is designated, the portion of the designated index number for the particular track number is reproduced while in access, whereas the portion of the designated index number for a track number to be accessed is reproduced while not in access. In the case where only a track number is designated, by contrast, the portion of the leading index number for the relevant track number is reproduced.

This disk reproduction apparatus further includes counting means for counting the track number, means for deciding whether the identification mark of a card having an identification mark commanding access to a designated track number or index number or an identification mark commanding the repeat reproduction commands the repeat reproduction, means for setting a predetermined value in the counting means in the case where it is decided that the repeat reproduction is commanded, means for outputting a command for accessing the area of the track number corresponding to the set value of the counting means and the registered index number, means for deciding whether the reproduction for the relevant area is completed, and means for updating the value on the counting means in the case where the decision is that the reproduction for the relevant area is completed.

In the case where a decision made as to whether the identification mark of a card having an identification mark commanding access to a designated track number, an identification mark commanding access to a designated index number or an identification mark commanding the repeat reproduction commands the repeat reproduction, and in the case where it is decided that the repeat reproduction is commanded, then, the value of the leading track number to be reproduced, for example, is set in the counting means for counting the track number. A command for accessing the area of a track number corresponding to the set value of the counting means and the registered index number is outputted, and it is decided whether the reproduction for the accessed area has been completed. In the case where the decision is that the reproduction for the accessed area is completed, the value in the infoing means is updated. In this way, the information in the area of the same index number for different track numbers is reproduced in the order of the track numbers.

A card used for this disk reproduction apparatus according to the invention has an identification mark for commanding access to a designated track number, an identification mark for commanding access to a designated index number or an identification mark for commanding the repeat reproduction.

Three types of cards are used for commanding the reproduction of an area of a designated track number, the reproduction of an area of a designated index number or the repeat reproduction. As a result, a specific address can be designated by a combination of a card having an identification mark designating a track number and an identification mark designating an index number. A combination of a card having an identification mark designating an index number and an identification mark commanding the repeat reproduction, on the other hand, allows a command to be issued for the repeat reproduction for different tracks in the order of the track number for the same index number.

The above and further objects and features of the invention will more fully be apparent from the following detailed description with accompanying drawings.

BRIEF DESCRIPTION OF THE DRAWINGS

FIG. 7 is a schematic diagram showing still another track of the CD.

FIG. 8 is a schematic diagram showing a further another track of the CD.

FIGS. 11A, 11B and 11C are flowcharts showing the procedure for access to the CD.

DESCRIPTION OF THE PREFERRED EMBODIMENTS

The invention is described below with reference to the drawings showing embodiments thereof.

First Embodiment

Figure 1:
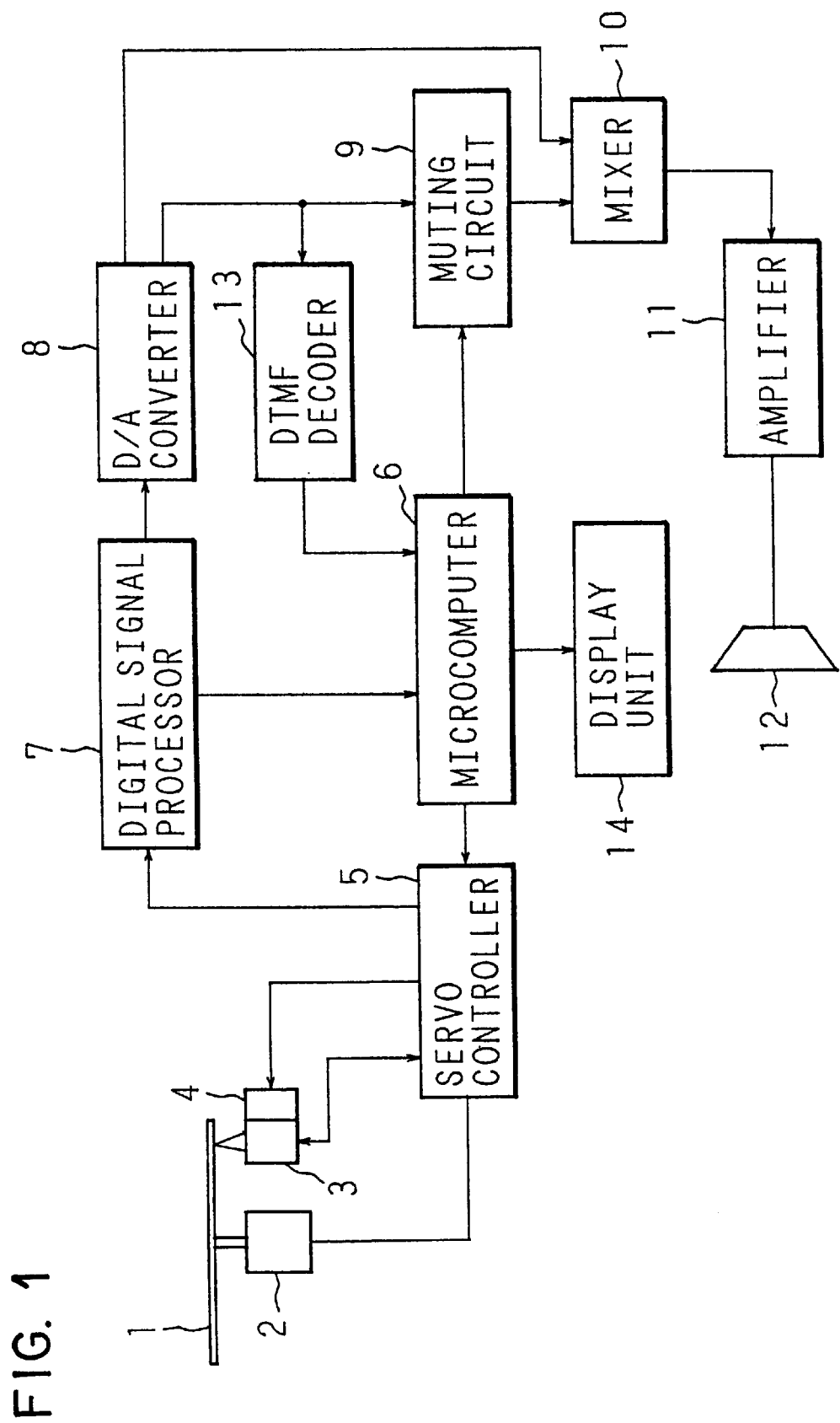
FIG. 1 is a block diagram showing the configuration of a disk reproduction apparatus (first embodiment) according to the invention.

FIG. 1 is a block diagram showing the configuration of a disk reproduction apparatus according to a first embodiment of the invention. In FIG. 1, numeral 2 designates a disk rotation device. A CD 1 is adapted to be mounted on the disk rotation device 2. A pickup 3 for reading the information recorded in the CD 1 is arranged in opposed relation to the CD 1. The pickup 3 is adapted for movement in the radial direction of the CD 1 by a thread motor 4. The rotative operation of the disk rotation device 2 and the thread motor 4 and the operation of the objective lens of the pickup 3 are controlled by a servo controller 5. Also, the servo controller 5 is supplied with a start-stop signal for the disk rotation device 2 and a drive signal for the thread motor 4 from a microcomputer 6.

Figure 2:
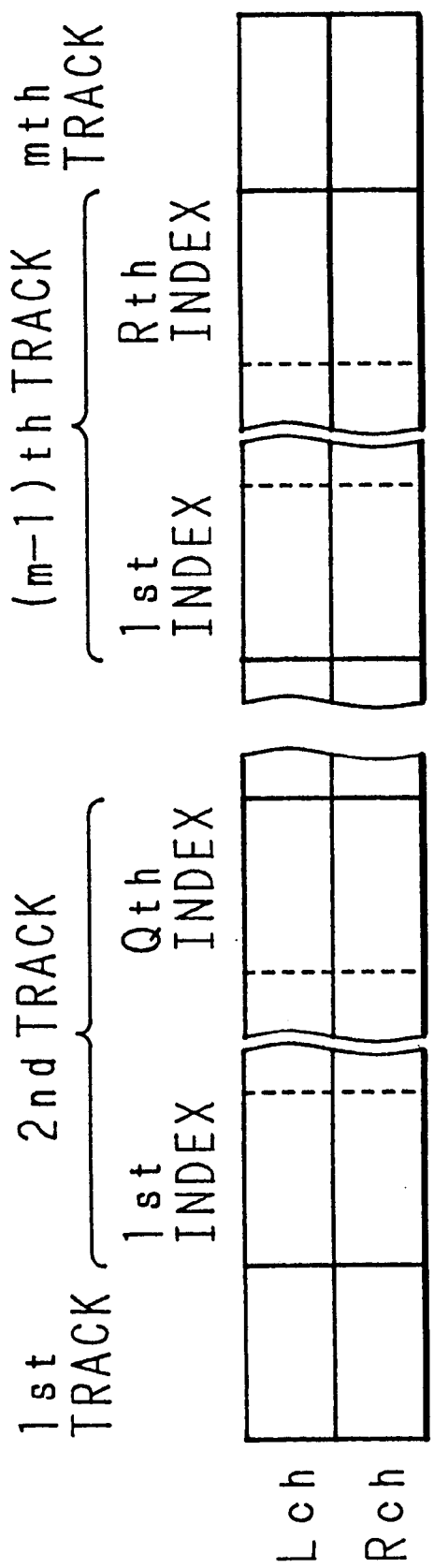
FIG. 2 is a schematic diagram showing an example of a CD format.

FIG. 2 is a schematic diagram showing an example format of the CD 1. The CD 1 has a track section formed thereon having two channels including a right (R) channel (ch) and a left (L) channel (ch). The track section is divided into a plurality of tracks from the leading one, each assigned a sequential track number. Each area assigned a track number is further divided into a plurality of portions, each assigned an index number. A track number and an index number constitute an address. The TOC information including the address construction of the areas of the second and subsequent tracks, the recording time for each address and the frame information, is recorded in the first track. On the other hand, an education program, for example, is recorded in the second to (m−1)th tracks, and information for ending all the programs is recorded in the mth track.

An education program is recorded in the L (R) channel of the second to (m−1)th tracks and the information to be reproduced as a DTMF signal corresponding to a command is recorded in the R (L) channel in accordance with the education program. The DTMF signal is one used for telephone tone dial and a superposition of two sinusoidal waves of different frequencies in the audio band. The frequencies thus superimposed are classified into four types each for low and high frequencies thereby making a total of 16 combinations available. The frequencies and the combinations are standardized and are defined in the name of 0, 1, . . . , 9, *, #, A, B, C and D respectively. According to this embodiment, the commands as shown in Tables 1 and 2, for example, are defined using this DTMF signal.

TABLE 1

| Command Jump designating command | Definition |
|---|---|
| Relative designation | |
| A | Jump to the head of index No. immediately preceding present index No. |
| B | Jump to the head of present index No. |
| C | Jump to the head of the index No. immediately following the present index No. |
| D | Jump to the head of the index No. secondly following the present index No. |
| Absolute designation 0203 | Jump to the third index of the second track |

TABLE 2

| Command | Definition |
| --- | --- |
| Unconditional jump command *0203 | Jump unconditionally to the destination designated by the jump command (0203) following *. |
| Conditional jump command #12DC | Pause after reading the command, and in the case where the correct information (12) coincides with the input information, jump to the destination designated by the first jump information (D). Otherwise, jump to the destination designated by the second jump information (C) |

The information recorded in Lch and Rch of the CD 1 are read as a digital signal by the pickup 3 respectively, and through the servo controller 5, is applied to a digital signal processor 7, where a read-out error is corrected. Also, the servo controller 5 servo-controls the operation of the disk rotation device 2, the thread motor 4 and the pickup 3 on the basis of the signal from the pickup 3. The digital signal the error of which has been corrected is applied to a digital/analog (D/A) converter 8, in which the digital signal is converted into a voice signal. After that, the voice signal of Rch recording the DTMF signal is applied to a DTMF decoder 13 and a muting circuit 9. The signal applied to the DTMF decoder 13 is decoded into commands of 0, 1, . . . , 9, *, #, A, B, C and D, which are applied to the microcomputer 6.

The movement control of the pickup 3 is defined beforehand in the microcomputer 6 as shown in Tables 1 and 2, and the microcomputer 6 issues a command signal to the servo controller 5 on the basis of the given command and the defined control operation. The information read from the CD 1 by the pickup 3, on the other hand, is applied to the microcomputer 6 through the digital signal processor 7. The microcomputer 6 decides whether the CD I records the DTMF signal on the basis of the TOC information contained in the particular information. In the affirmative case, the muting circuit 9 is activated so that the voice signal for the Rch recording the DTMF signal is muted while at the same time displaying a predetermined sign on the display unit 14.

The Rch voice signal outputted from the muting circuit 9 is applied to a mixer 10. The mixer 10 is supplied with a Lch voice signal from the D/A converter 8, and the mixed signal from the mixer 10 is amplified to a predetermined level by an amplifier 11 and produced from a speaker 12.

Figure 3:
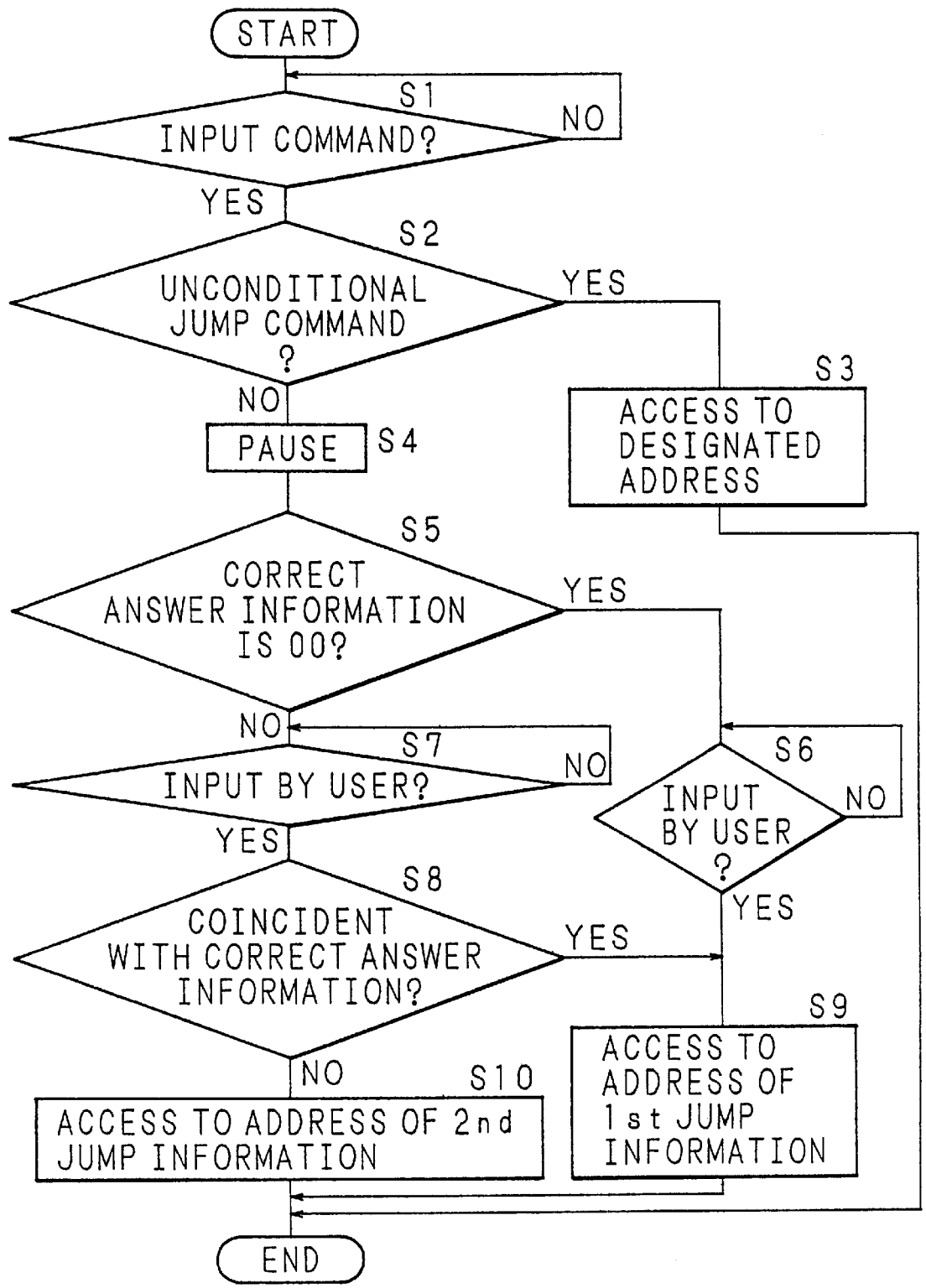
FIG. 3 is a flowchart showing the procedure for pickup movement control.

FIG. 3 is a flowchart showing the procedure for movement control of the pickup 3 by the microcomputer 6. The microcomputer 6 is held in ready state until a command is given thereto from a DTMF decoder 13 (step SI), and upon receipt of a command, decides whether the command is for unconditional jump as designated in Table 2 (step S2). In the case where the particular command is for unconditional jump, the microcomputer 6 moves the pickup 3 in order to access the address designated by the jump command contained in the command (step S3).

In the case where the command is not for unconditional jump, by contrast, it is decided that the command is for conditional jump, and the movement of the pickup 3 is temporarily stopped for a pause (step S4). At the same time, it is decided whether the correct answer information in the command is 00 or not (step S5). In the case where the correct answer information is 00, an input by the user is awaited (step S6). When an input is applied, the-pickup 3 is moved in order to access the address designated by the first jump information of the command (step S9).

Also, in the case where step S5 decides that the correct answer information is not 00, on the other hand, an input by the user is awaited (step S7), and in the presence of an input, it is decided whether the input information coincides with the correct answer information (step S8). In the case where the input information coincides with the correct answer information, the process is passed to step S9 to access the address designated by the first jump information. In the absence of coincidence, the pickup 3 is moved in order to access the address designated by the second jump information (step S10).

Figure 4:
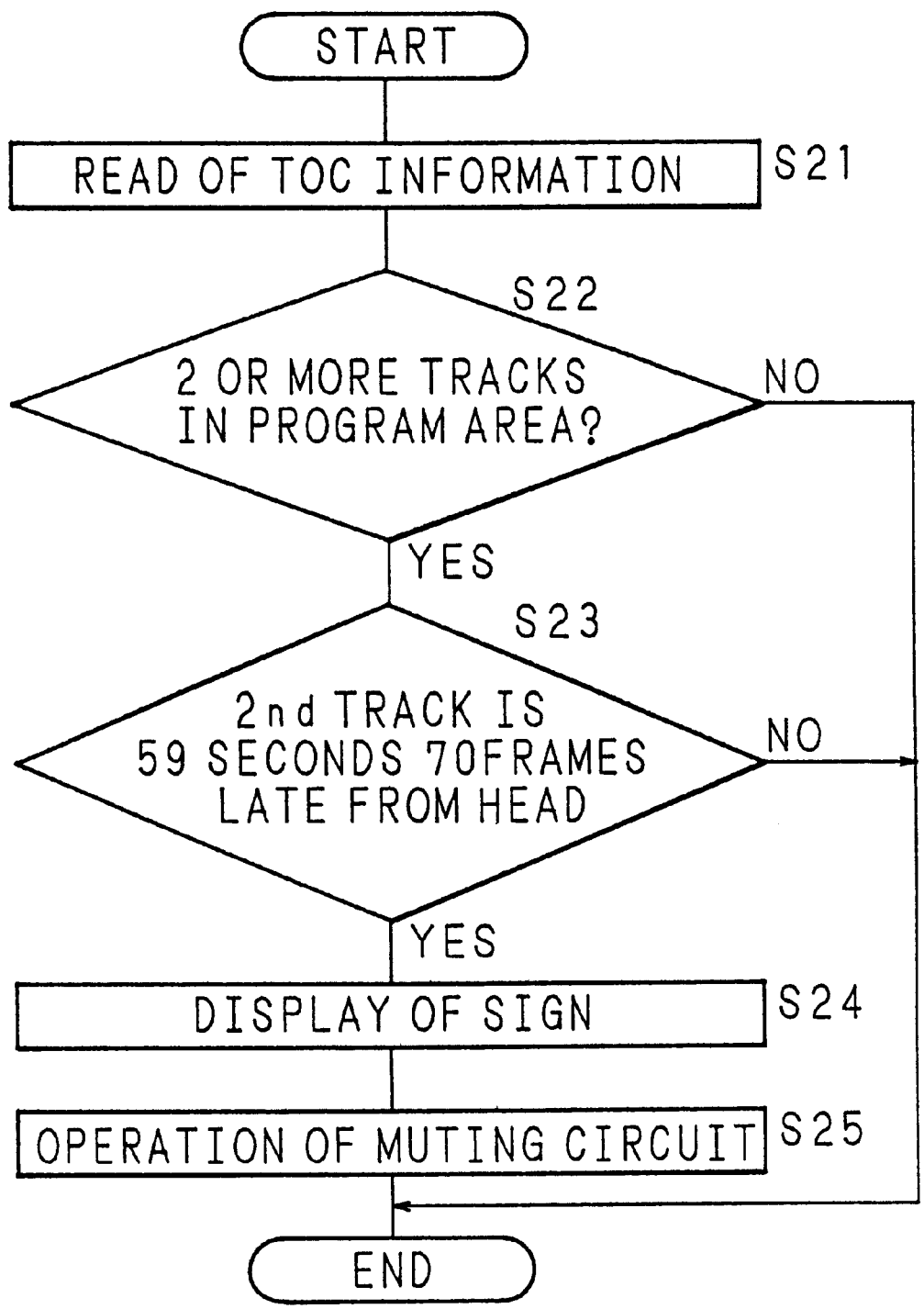
FIG. 4 is a flowchart showing the procedure for decision according to TOC information.

FIG. 4 is a flowchart showing the procedure for decision in accordance with the TOC information. The CD 1 recording the DTMF signal also records the TOC information as identification information indicating that the head of the second track of the program area is 59 seconds and 70 frames later than the leading track. The microcomputer 6 reads the TOC information supplied from the digital signal processor 7 (step S21), and decides whether the program area has at least two tracks (step S22). In the presence of two or more tracks, it is further decided whether the second track is started 59 seconds and 70 frames behind the leading track (step S23). In the affirmative case, it is decided that the CD 1 records the DTMF signal and a predetermined sign is displayed on the display unit 14 (step S24). At the same time, the muting circuit 9 is activated thereby to mute the voice signal for the Rch storing the DTMF signal (step S25).

According to this embodiment, the identification information as to whether the CD records the DTMF signal is applied as the TOC information. As an alternative, the DTMF signal representing 0123456789, for example, may be recorded as identification information in the first track of the program area so that decision may be made on the basis of the particular identification information.

Now, an application example of the first embodiment is described.

Figure 5:
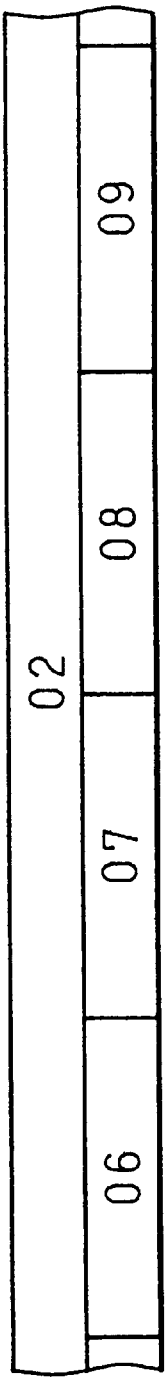
FIG. 5 is a schematic diagram showing a track of the CD.
Figure 5:
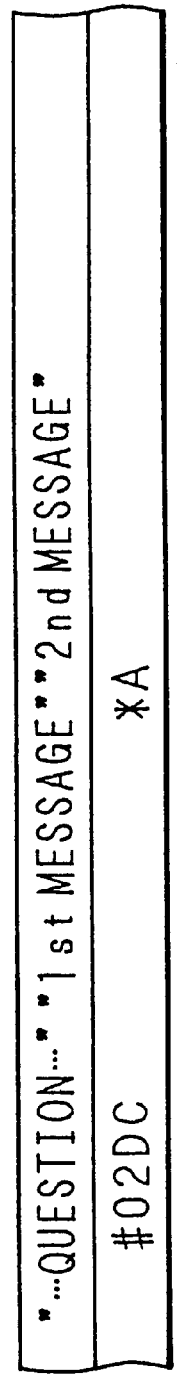

FIG. 5 is a schematic diagram showing a track of the CD 1. This application concerns the case of a question the answer to which is selected out of four candidates. As shown in FIG. 5, the sixth index of the second track of the CD 1 records on Lch the voice signal of the following question, and on Rch the DTMF signal representing #02DC indicating a conditional jump command. As obvious from Tables 1 and 2, after a voice is outputted giving a question "Select one of the following four cities as the capital of Spain: 1. Risbon, 2. Madrid, 3. Marseilles, 4. Barcelona", for example, the pickup 3 is set in pause mode, and an input from the user is awaited.

Upon an input from the user, it is decided whether the input is 02 or not, and in the case where the input is 02, the process jumps to the head of the eighth index of the second track, while in the case where the input is not 02, the process jumps to the head of the seventh index. The second message to the effect that "Correct. Now, let's proceed to the next question" is recorded on Lch of the eighth index. After outputting the second message, the pickup 3 moves directly to the ninth index.

The seventh index, on the other hand, records the voice signal of the first message on Lch to the effect that "Wrong. The same question will be repeated", while the DTMF signal representing the unconditional jump command of *A is recorded on Rch. As a result, in the case where the input is not 02, after outputting the first message, the pickup 3 is moved to the head of the immediately preceding sixth index, and the question is repeated.

Figure 6:
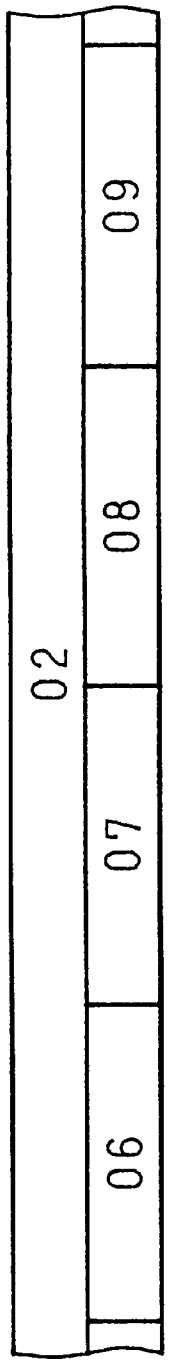
FIG. 6 is a schematic diagram showing another track of the CD.
Figure 6:
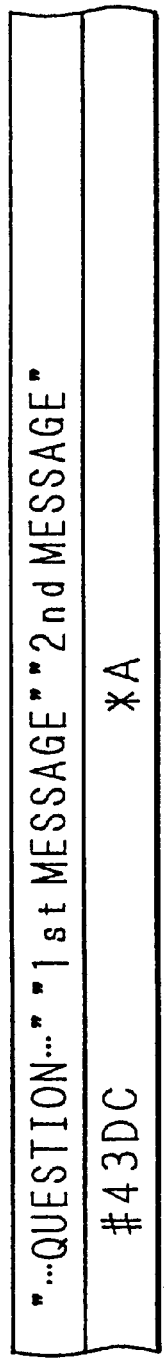

FIG. 6 is a schematic diagram showing another track of the CD 1 and represents an application to an arithmetic question. As shown in FIG. 6, the sixth index of the second track records a voice signal on Lch giving a question to the effect that "What is the sum of 27 and 16?", for example, and a DTMF signal representing a conditional jump command of #43DC on Rch. After the voice of this question is outputted, the pickup 3 is set in pause mode awaiting an input from the user.

When an input is received from the user, it is decided whether the input is the correct answer of 43, and in the case where the answer is correct, the process jumps to the head of the eighth index of the second track, while when the answer is not correct, the process jumps to the head of the seventh index. A voice signal of the second message meaning "Correct. Let's proceed to the next question" is recorded on Lch of the eighth index. After outputting the second message, the pickup 3 moves directly to the ninth index.

At the seventh index, on the other hand, recorded on Lch is the voice signal of the first message to the effect that "Wrong. The same question will be repeated", and a DTMF signal representing an unconditional jump command of *A is recorded on Rch. When the answer is not correct, therefore, after the first message is outputted, the pickup 3 moves to the head of the immediately preceding sixth index thereby to repeat the same question.

FIG. 7 is a schematic diagram showing still another track of the CD 1, representing an application to the counting of the number of correct answers. As shown in FIG. 7, the voice signal of question 1 is recorded at the sixth index, the voice signal of question 2 at the seventh and eighth indexes, and the voice signal of question 3 at the ninth to 12th indexes on Lch. The voice signal meaning "Three questions answered correctly" is recorded as a message at the 13th index, the voice signal meaning "Two questions answered correctly" at the 14th index, the voice signal meaning "One question answered correctly" at the 15th index, and the voice signal meaning "No question answered correctly" at the 16th index.

Recorded on Rch, on the other hand, is a DTMF signal representing a conditional jump command for jumping to the seventh index when the answer is correct and to the eighth index when the answer is not correct, at the sixth index, a DTMF signal representing a conditional jump command for jumping to the ninth index when the answer is correct and to the tenth index when the answer is not correct, at the seventh index, and a DTMF signal representing a conditional jump command for jumping to the 13th index when answer is correct and to the 14th index when the answer is not correct, at the ninth index, respectively.

In the case where the answer to question 1 at the sixth index is correct, for example, the voice of question 2 recorded at the seventh index is outputted, and when the answer to the question is correct, the voice of question 3 recorded at the ninth index is outputted. In the case where the answer to that question is correct, the voice to the effect that "Three questions answered correctly" recorded at the 13th index is outputted. In the case where question 1 at the 6th index is not correctly answered, by contrast, the voice of question 2 recorded at the eighth index is outputted. When the answer to that question is not correct, the voice of question 3 recorded at the 12th index is outputted, and in the case where the answer to that question is incorrect, the voice to the effect that "No answer is correct" recorded at the 16th index is outputted.

FIG. 8 is a schematic diagram showing still another track of the CD, representing the case applied to a Karaoke system. As shown in FIG. 8, an acoustic signal of the first message representing various messages and voices of various musical intervals is recorded in the Lch of the sixth index. A DTMF signal representing a conditional jump command for jumping to the next index whenever any input is applied is recorded on Rch. The contents of the first message are as follows. "Select from the following the highest voice that you can produce when singing: No.1 Aaah, No.2 Aaah, No.3 Aaah, No.4 Aaah, No.5 Aaah, No.6 Aaah: Push any of buttons Nos. 1 to 6".

After the first message is outputted, the operation enters the pause mode, and when any input is applied from the user, the process jumps to the seventh index, so that the voice to the effect that "O.K. The keys will be adjusted to help you sing most easily" recorded on Lch of the seventh index as the second message is outputted. In the process, the Karaoke system is automatically modulated.

According to the embodiment under consideration, a disk is used for recording a DTMF signal on Rch (Lch) and an acoustic signal on Lch (Rch). The invention is not limited to such a configuration, but a disk may of course be used in which a DTMF signal is recorded following an acoustic signal. In such a case, a signal to be decoded into a mute command signal is added to the DTMF signal, thereby preventing the sound associated with these signals from being outputted. The DTMF signal used according to the embodiment may be replaced by a plurality of signals of a predetermined frequency and/or a signal having a different record length in the audio band.

As described in detail above, the first embodiment, according to which an education program in dialogue form can be executed, is widely applicable. Also, an interaction meeting the CD-DA (Compact Disk-Digital Audio) standard can be realized without using any complicated system of CD-ROM (Compact Disk-Read Only Memory) or CD-I (Compact Disk-Interactive), and therefore the cost is low for both software and hardware.

Also, in the case where the information associated with the audio band signal recorded in the disk is reproduced and directly outputted, the reproduced sound constitutes a noise against the output of the acoustic information recorded separately. Since the output level of the audio band signal is reduced according to the first embodiment, however, the mixing of a noise is prevented. Also, the user can decide instantaneously whether the disk mounted on the disk reproduction apparatus records information associated with the audio band signal. In the case where a wrong disk is mounted erroneously, therefore, the disk can be replaced immediately. Further, in the case where the disk records information associated with the audio band signal, the user can make preparations for an education program.

Second Embodiment

Figure 9:
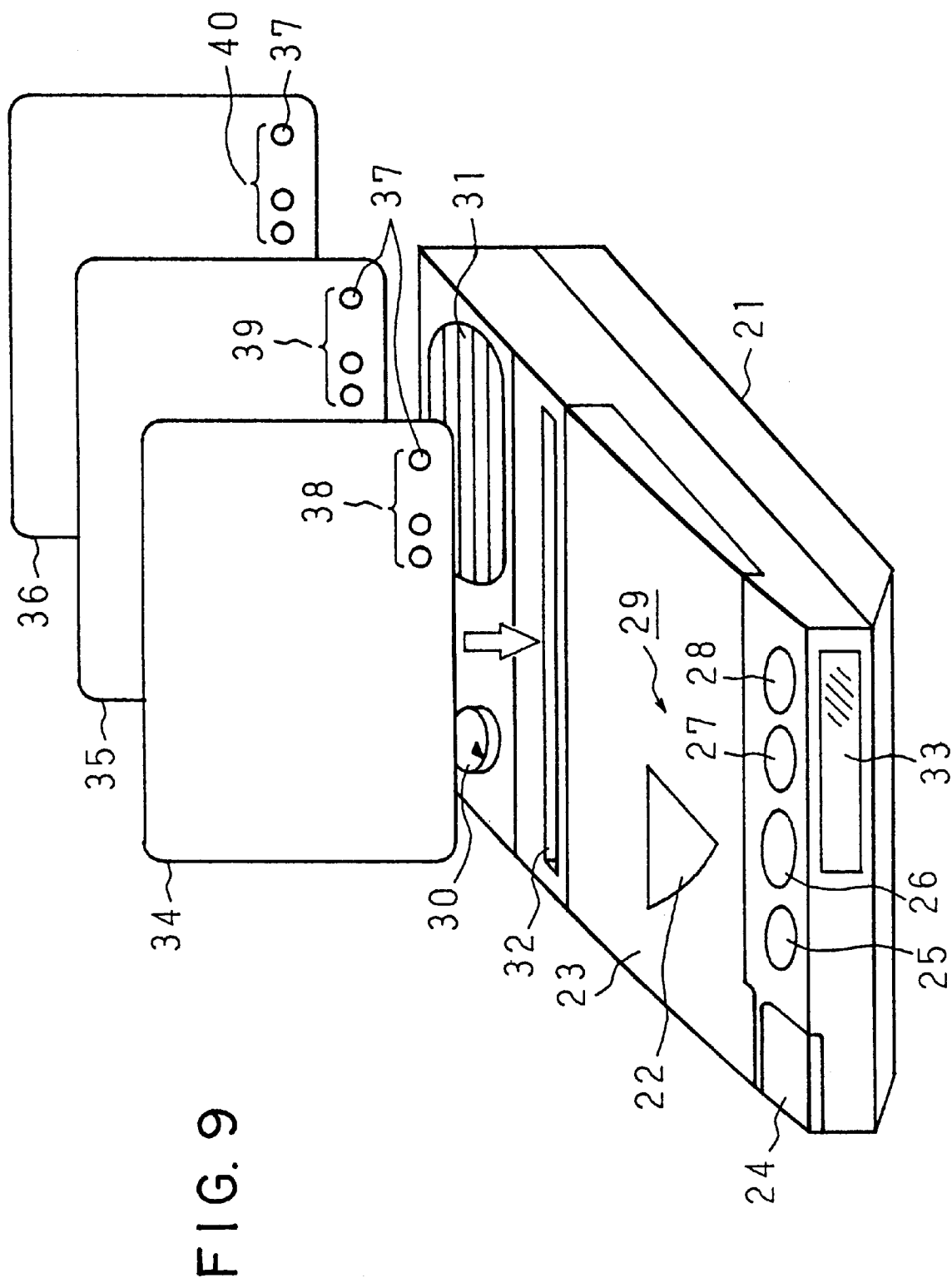
FIG. 9 is a perspective view showing the external appearance of a disk reproduction apparatus (second embodiment) according to the invention.

FIG. 9 is a perspective view showing the external appearance of a disk reproduction apparatus according to a second embodiment of the invention. In FIG. 9, numeral 21 designates a body. A cover 23 having a transparent window 22 is arranged at substantially the central portion of the uppermost surface of the body 21. An opening button 24 is provided at a corner of the uppermost surface of the body 21. By operating the opening button 24, the cover 23 opens upward, so that the CD can be mounted on the body 21 and the cover 23 can be closed under the pressure applied by the user.

A button operation unit 29 including a stop button 25 for stopping the reproduction of the CD, a reproduction button 26 for starting reproduction, a forward skip button 27 and a reverse skip button 28 for skipping a track number or track numbers in that order is arranged in spaced relation from the opening button 24 at an end of the body 21. A display 33 for indicating the track number, the index number and the reproduction time is arranged on a side of the body 21.

The other end of the body 21 has a speaker sounding section for issuing the sound from the speaker 60 (see FIG. 10) mounted on the back of the particular end. An adjusting knob 30 for adjusting the sound volume of the speaker is arranged in the neighborhood of the speaker sounding section 31. A slit 32 is opened between the speaker sounding section 31 and the cover 23. The slit 32 can accommodate a track-designating card 34 having an identification mark 38 with a plurality of identification holes 37, 37, . . . for designating the track number, an index-designating card 35 having an identification mark 39 for designating the index number or a repeat card 36 having an identification mark 40 for designating a repeat reproduction in the order of track numbers. A reader to be described later for reading the identification marks 38, 39 and 40 is arranged in the slit 32.

Each of the cards 34, 35 and 36 has an end thereof formed with seven or less holes 37, 37, . . . at predetermined positions. A total of 127 (=$2^7$–1) types of cards 34, 35 and 36 can be prepared depending on whether the holes 37, 37, . . . are opened or not. In the case of using a CD with 99 tracks, for example, it is possible to prepare 99 types of track-designating cards 34, 27 types of index-designating cards 35 and one type of repeat card 36. For designating all the 99 tracks and the 99 indexes, eight holes must be opened. In this way, all the 99 tracks and the 99 indexes can be designated with a total of 198 cards including the track-designating cards 34 and the index-designating cards 35.

A picture, a character or the like is printed in the track-designating card 34 and the index-designating card 35 in accordance with the information recorded in the CD used. The repeat card 36 also has a picture, a character or the like printed thereon for indicating the commanded operation. As a result, the user can designate the track number or the index number by selecting a desired track-designating card 34 or a desired index-designating card 35 on the basis of the picture, character or the like printed on the card and inserting the selected card into the slit 32. Also, the user can command the repeat reproduction by inserting the repeat card in the slit 32.

Figure 10:
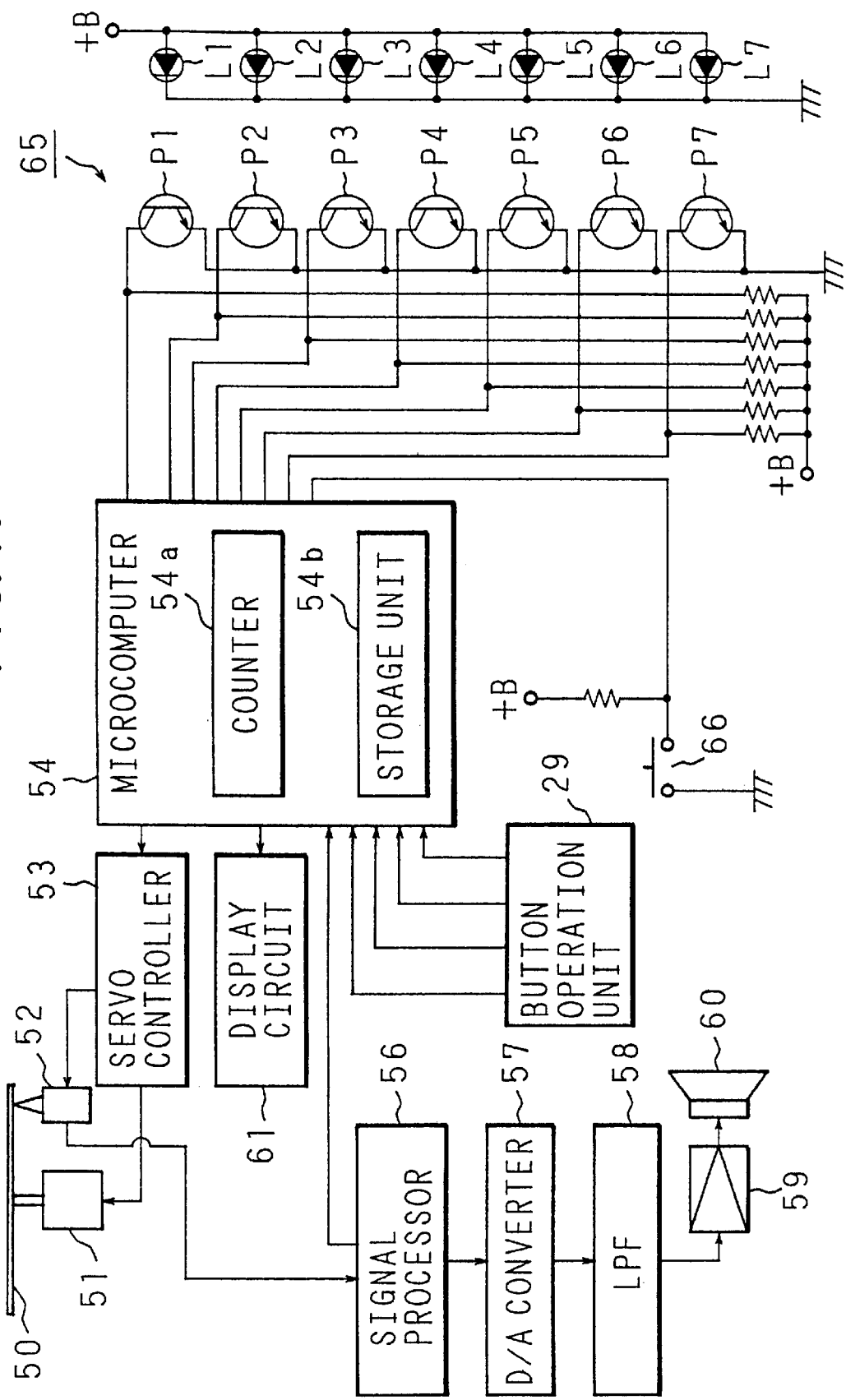
FIG. 10 is a block diagram showing the configuration of the disk reproduction apparatus shown in FIG. 9.

FIG. 10 is a block diagram showing the configuration of the disk reproduction apparatus shown in FIG. 9. In FIG. 10, numeral 51 designates a disk rotation device, on which a CD 50 is mounted. A pickup 52 is arranged movably in the radial direction of the CD 50 in opposed relation to the CD 50. The pickup 52 is adapted to be moved by a thread motor (not shown). The rotation of the thread motor and the disk rotation device 51 and the operation of the objective lens of the pickup 52 are controlled by a servo controller 53. Also, the servo control circuit 53 is supplied with a start-stop signal for the disk rotation device 51 and a drive signal for the thread motor from the microcomputer 54 or the like.

The microcomputer 54 is supplied with a reproduction start signal, a reproduction stop signal, a forward skip signal for track numbers and a reverse skip signal for track numbers from the button operation unit 29 shown in FIG. 9 on the one hand, and with a read signal for the number and positions of the holes opened in the track-designating card 34, the index-designating card 35 or the repeat card 36 (see FIG. 9 for the cards) inserted in the slit 32 from the reader 65 arranged in the slit 32 (see FIG. 9) on the other hand. The microcomputer 54 applies a command signal to the servo controller 53 on the basis of these signals. Also, the microcomputer 54 includes a counter 54a to be described later and a storage unit 54b for storing the track numbers and the index numbers.

When the pickup 52 accesses a desired area of the CD 50 by drive control of the servo controller 53, the pickup 52 reads out the information recorded in the CD 50 as a digital signal and applies the signal to a signal processor 56. The signal processor 56 demodulates the applied digital signal and applies the demodulated signal to a D/A converter 57 and the microcomputer 54. The digital signal applied to the D/A converter 57 is converted into an analog signal and the unrequired components are removed by a low-pass filter (LPF) 58, after which the signal is amplified by an amplifier 59 and outputted from a speaker 60.

The TOC information including such information as the track number and the recording time for each track number of the CD 50 are recorded in the CD 50. The microcomputer 54 stores this TOC information, applies the stored TOC information to a display circuit 61 and causes the TOC information to be displayed on a display unit 33 (see FIG. 9).

Light-emitting diodes L1 to L7 of the reader 65 are arranged at predetermined intervals on one surface in the slit 32. Phototransistors P1 to P7 corresponding to the light-emitting diodes L1 to L7 respectively are arranged on the opposed surface in the slit 32. The holes 37, 37, . . . opened in the track-designating card 34, the index-designating card 35 and the repeat card 36 correspond to the light-emitting diodes L1 to L7 and the phototransistors P1 to P7. The light emitted from the light-emitting diodes L1 to L7 are passed through the holes 37, 37, . . . of the cards 34, 35 and 36 and enter the phototransistors P1 to P7.

The anode of each of the light-emitting diodes L1 to L7 is impressed with a +B voltage and the cathode thereof grounded. The collector of each of the phototransistors P1 to P7 is connected to the microcomputer 54 and at the same time is impressed with the +B voltage, with the emitter thereof grounded. As a consequence, in the case where the light from the light-emitting diodes L1 to L7 reaches the phototransistors P1 to P7, the phototransistors P1 to P7 are in on state, and the microcomputer 54 recognizes that the holes 37, 37, . . . are opened at corresponding positions of the track-designating card 34, the index-designating card 35 or the repeat card 36. In the case where the light from the light-emitting diodes L1 to L7 fails to reach the phototransistors P1 to P7, on the other hand, the phototransistors P1 to P7 are in off state, and the microcomputer 54 recognizes that the holes 37, 37,...are not opened at corresponding positions of the track-designating card 34, the index-designating card 35 or the repeat card 36.

Also, a detection switch 66 for detecting the insertion of a card is arranged in the slit 32. When a card is inserted in the slit 32, the detection switch 66 turns on, so that the microcomputer 54 recognizes that a card has been inserted in the slit 32.

The microcomputer 54, depending on the on or off state of the phototransistors P1 to P7, identifies the track number designated by the track-designating card 34, the index number designated by the index-designating card 35 or the command of repeat reproduction by the repeat card 36, applies a command signal to the servo controller 53, and causes the pickup 52 to move and access the desired area of the CD 50.

Figure 11A:
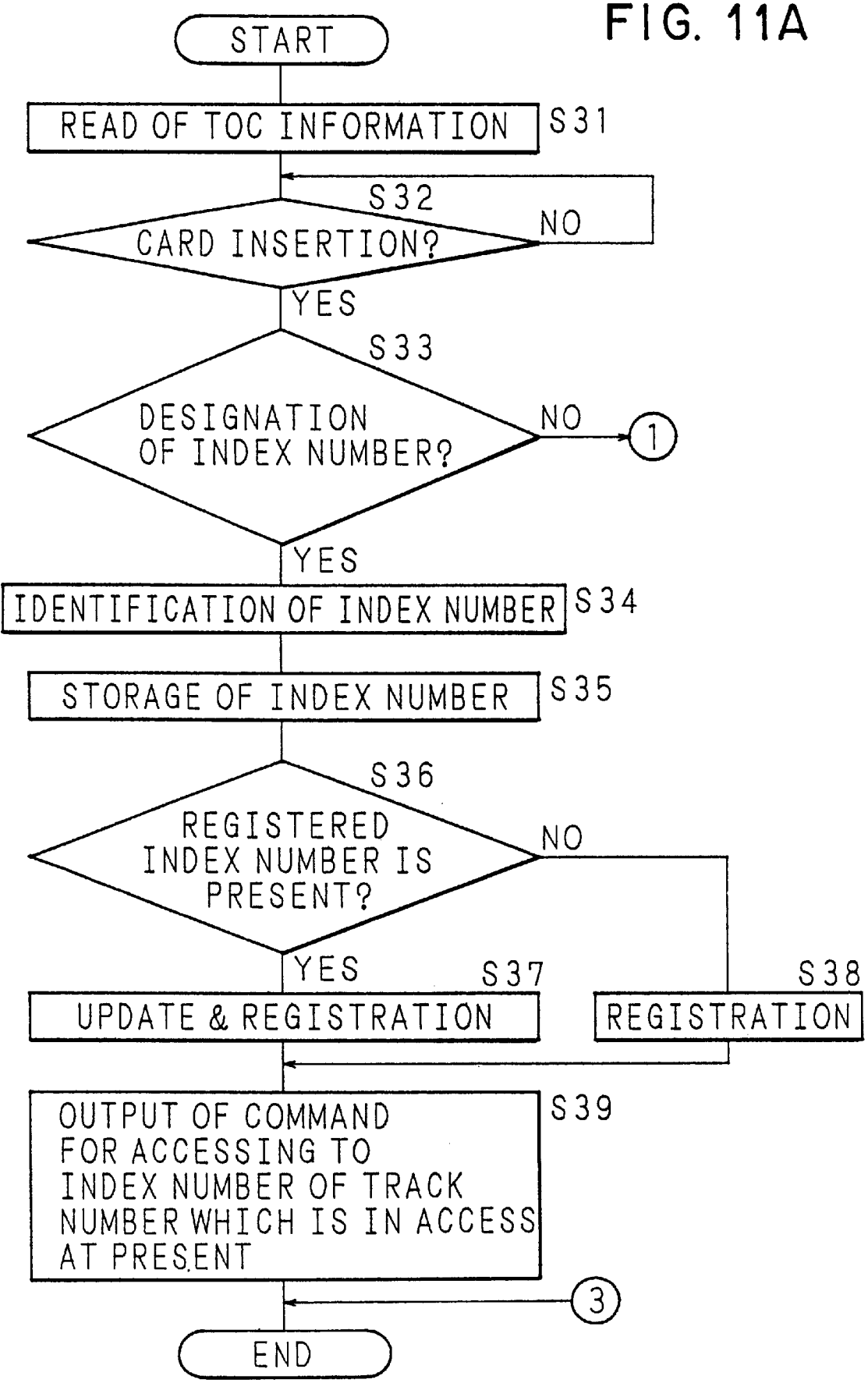
Figure 11B:
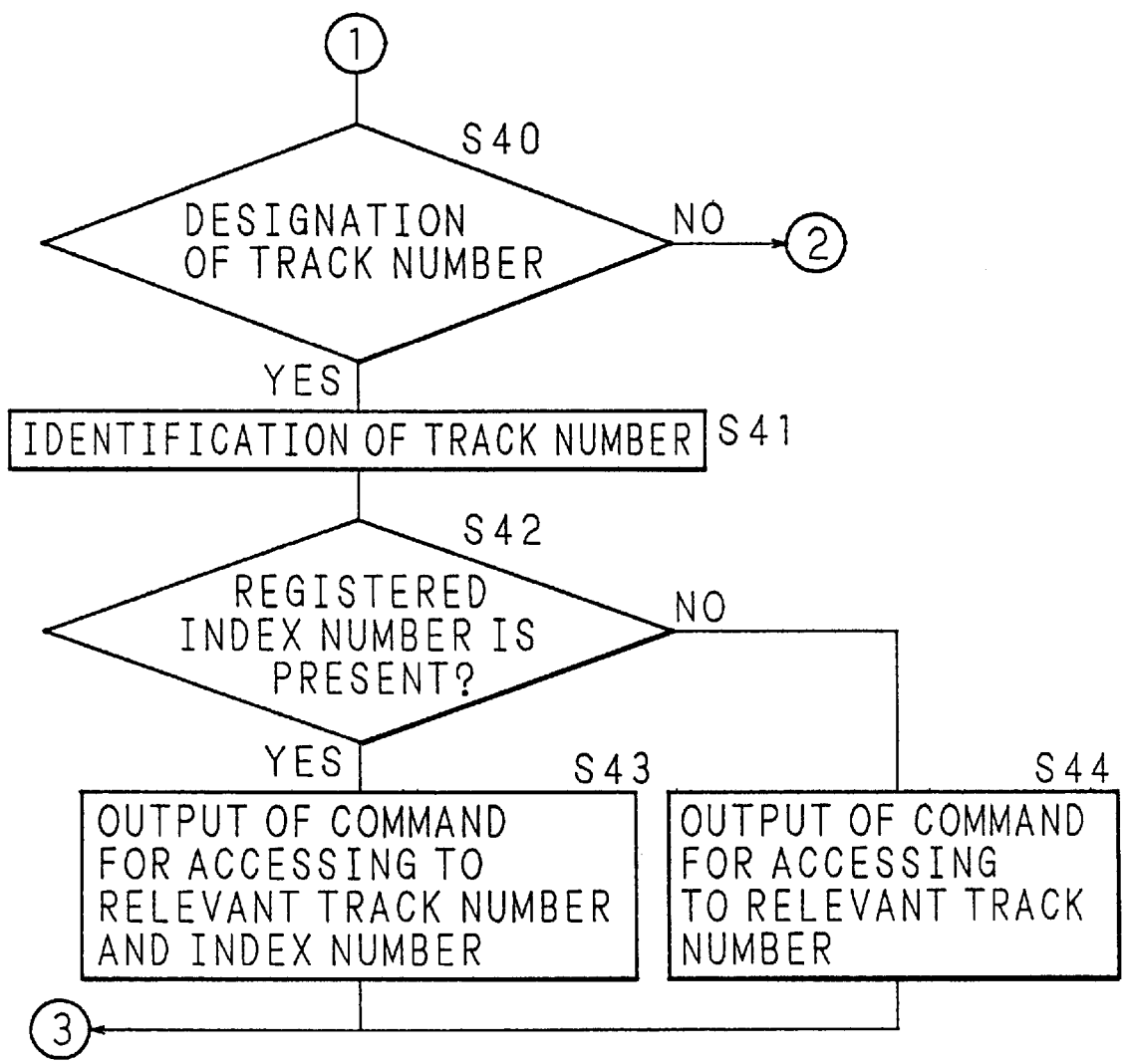

FIGS. 11A, 11B and 11C are flowcharts showing the sequence of access to the CD 50. When a reproduction command of the CD 50 is issued, the microcomputer 54 outputs a command signal to access the leading portion of the track number of the CD 50. The TOC information, when read from the CD 50, is stored in the storage unit 54*b* (step S31), and accessed in the order of track numbers until a card detection signal is supplied from the detection switch 66 (step S32).

When a signal is supplied from the reader 65, the microcomputer 54 decides whether the supplied signal is for designating an index number or not (step S33), and upon decision that the signal designates an index number, the microcomputer 54 identifies the index number (step S34). The index number thus identified is stored in the storing unit 54*b* (step S35). Then, it is decided whether there is an index number registered in a predetermined area (means for being registered an index number) of the storage unit 54*b* (step 36), and in the absence of any such index number, an index number is newly registered (step S38). In the presence of an index number registered in a predetermined area of the storage unit 54*b*, by contrast, the relevant index number is updated to the stored index number and registered (step S37). The microcomputer 54, as described above, outputs a command for accessing the portion of the index number registered or updated and registered for the presently accessed track number (step S39).

Further, in the case where step S33 decides that the signal supplied is not for designating an index number, on the other hand, it is decided whether the signal applied from the reader 65 is for designating a track number (step S40). When the answer is affirmative, the microcomputer 54 identifies the track number (step S41). At the same time, the microcomputer 54 decides whether there is any registered index number (step S42), and in the presence of such an index number, outputs a command for accessing the portion determined by the identified track number and the registered index number (step S43). In the absence of any registered index number, on the other hand, the microcomputer 54 outputs a command for accessing the portion of the leading index number for the identified track number (step S44).

In the case where steps S40 decides that a track number is not designated, on the other hand, the microcomputer 54 decides whether or not the signal supplied from the reader 65 commands the repeat reproduction (step S50), and when the answer is affirmative, further decides whether or not there is any registered index number (step S51). When there is any registered index number, the value on the counter 54*a* for counting the tracks in the microcomputer 54 is set to the leading value of the track number to be reproduced (step S52), and a command is outputted for accessing the portion determined by the relevant track number and the registered index number (step S53).

The microcomputer 54 decides whether the reproduction of the index number has been completed or not on the basis of the TOC information (step S54), and when the decision is affirmative, decides whether the value on the track counter 54*a* is identical with the last track number to be reproduced (step S55). When the number is not identical, the value on the counter 54*a* is incremented by one (step S56) and the process returns to step S53. In the case where the value on the counter 54*a* is the same as the last track number to be reproduced, on the other hand, the process returns to step S52, and a command is outputted for accessing the track numbers sequentially from the leading one thereof to be reproduced in a similar fashion.

As described above in detail, with a disk reproduction apparatus according to the second embodiment, a predetermined track number and index number can be specified separately from each other by use of a card, and therefore even infants can designate an address easily. Also, in view of the fact that once an index number is registered, information of the same index number is reproduced even when the track number is changed, the use of a disk recording words for the beginners' course at the first index, words for the middle course at the second index and words for the advanced course at the third index, for example, enables the words for the beginners' course to be reproduced at different track numbers once the first index is registered. As a result, software programs of different levels can be recorded in a single disk for a reduced cost. Further, even infants can easily change the level from the beginners' course to the middle course, or to the advanced course easily without replacing the disk. Consequently, infants can repeatedly reproduce words for the middle course, for example, in the order of track numbers, thereby achieving a high learning effect. Also, since a track number and an index number are designated separately from each other, an address can be designated with a minimum number of cards. An address can be practically designated by a card even for a disk divided into 99 tracks and 99 indexes.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method for disk reproduction wherein a disk is used, in which each of a plurality of areas each assigned a track number has a plurality of portions each assigned an index number, the disk records information at each of the portions, and an identification mark of a card having the identification mark commanding access to the disk is identified, thereby reproducing the information recorded in the disk, comprising the steps of:

deciding whether the identification mark of a card having selected one of an identification mark commanding access to a designated track number and an identification mark commanding access to a designated index number designates an index number;

identifying the designated index number in the case where it is decided that the index number is designated;

registering the identified index number;

deciding whether the identification mark of the card designates a track number;

identifying the designated track number in the case where it is decided that the track number is designated; and outputting a command for accessing the area of the identified track number and the registered index number.

2. A method for disk reproduction according to claim 1, wherein selected one of the identification mark commanding access to a designated track number and the identification mark commanding access to a designated index number is formed by a pattern of holes opened in the card.

3. A disk reproduction apparatus wherein a disk mounted therein has a plurality of areas each assigned a track number, each of the areas has a plurality of portions each assigned an index number, the disk records information at each of the portions, and an identification mark of a card having the identification mark commanding access to the disk is identified thereby to reproduce the information recorded in the disk, comprising:

means for deciding whether the identification mark of a card having selected one of an identification mark commanding access to a designated track number and an identification mark commanding access to a designated index number designates an index number;

means for identifying the designated index number in the case where it is decided that the index number is designated;

means for registering an index number;

means for being registered an index number;

means for deciding whether there is any registered index number;

means for updating and registering the identified index number in the case where there is any registered index number;

means for deciding whether the identification mark of the card designates a track number;

means for identifying the designated track number in the case where it is decided that the track number is designated; and means for outputting a command for accessing the area of the identified track number and the registered index number.

4. A disk reproduction apparatus according to claim 3, further comprising:

counting means for counting the track numbers;

means for deciding whether the identification mark of a card having selected one of the identification mark and an identification mark commanding a repeat reproduction designates the repeat reproduction;

means for setting a predetermined value on said counting means in the case where it is decided that the repeat reproduction is designated;

means for outputting a command for accessing the area of the track number corresponding to the set value on said counting means and the registered index number;

means for deciding whether the reproduction for the relevant area is completed; and means for updating the value set on said counting means in the case where it is decided that the reproduction for the relevant area is completed.

* * * * *